US011292299B2

(12) United States Patent
Ingram et al.

(10) Patent No.: US 11,292,299 B2
(45) Date of Patent: Apr. 5, 2022

(54) APPARATUS FOR DELIVERING AIR THROUGH TRAILER AXLE SYSTEM

(71) Applicants:IP Holdings One, LLC, Guthrie, OK (US); Lenny Ray Stone, Flagler, CO (US)

(72) Inventors: Anthony L. Ingram, Edmond, OK (US); Marvin Lyle Stone, Stillwater, OK (US)

(73) Assignee: IP Holdings One, LLC, Guthrie, OK (US)

( * ) Notice: Subject to any disclaimer, the term of this patent is extended or adjusted under 35 U.S.C. 154(b) by 689 days.

(21) Appl. No.: 15/249,251

(22) Filed: Aug. 26, 2016

(65) Prior Publication Data

US 2018/0056733 A1    Mar. 1, 2018

(51) Int. Cl.
*B60C 23/00*    (2006.01)

(52) U.S. Cl.
CPC .......... *B60C 23/003* (2013.01); *B60C 23/006* (2013.01)

(58) Field of Classification Search
CPC ... B60C 23/003; B60C 23/004; B60C 23/006; B60C 23/009; B60C 23/005; B60C 23/007; B60C 23/10; B60C 23/001; B60C 23/00327; B60C 23/00336
See application file for complete search history.

(56) References Cited

U.S. PATENT DOCUMENTS

| | | | | |
|---|---|---|---|---|
| 1,801,716 A * | 4/1931 | Bowers | ................. | B60C 23/003 152/417 |
| 6,105,645 A * | 8/2000 | Ingram | ................. | B60C 23/003 152/415 |
| 6,244,316 B1 * | 6/2001 | Naedler | ................. | B60C 23/003 152/417 |
| 6,585,019 B1 * | 7/2003 | Ingram | ................. | B60C 23/003 152/417 |
| 2012/0280469 A1 * | 11/2012 | Normand | ............... | B62K 25/02 280/279 |
| 2012/0318422 A1 * | 12/2012 | Lloyd | ................... | B60C 23/003 152/417 |
| 2013/0087262 A1 * | 4/2013 | Hennig | ................... | B60C 23/00 152/417 |

* cited by examiner

*Primary Examiner* — Scott A Browne
(74) *Attorney, Agent, or Firm* — Schaffer IP Law, LLC

(57) ABSTRACT

A rotary union assembly for use with a tire inflation system includes a hollow tube configured to deliver air between proximal and distal ends, a bullet having a central axial aperture receiving the tube therethrough, a proximal retaining structure defined on the proximal end of the tube, and a distal retaining structure defined on a distal end of the tube, configured to retain the bullet on the tube therebetween. A cartridge is coupled to a distal end of the tube and includes one or more apertures on a sidewall thereof in fluid communication with the tube. In use, the rotary union assembly is coupled between a non-rotating axle of a vehicle and the rotating hubcap of a tire rotating about the axle and may be removed as a unit for repair and/or replacement of wear parts on the assembly.

11 Claims, 8 Drawing Sheets

APPARATUS FOR DELIVERING AIR THROUGH TRAILER AXLE SYSTEM

BACKGROUND OF THE INVENTION

1. Field of the Invention

The present invention relates to an improved rotary assembly for use in a central tire inflation system for automatically maintaining the inflation pressure of the pneumatic tires on moving vehicles such as tractor trailers.

2. Description of the Prior Art

Automatic central tire inflation systems for vehicle tires are well known and the subject of several U.S. patents, including U.S. Pat. Nos. 3,276,503; 4,387,931; 4,883,106; 5,287,906; 5,584,949; and 6,105,645, the disclosures of which are incorporated herein by reference.

The central tire inflation systems employed on typical tractor trailers utilize the air compressor on the tractor as a source of pressurized air to fill a leaking tire while the trailer is in motion. The compressor directs air to the reserve air brake tank on the trailer, which generally corresponds to the range of typical inflation pressures in the tires used on trailers. Air from the reserve air brake tank is first directed to the braking system to maintain the air pressure in the braking system. Excess air is directed from the tank through a pressure protection valve to a control box for the tire inflation system. The pressure protection valve only opens to direct the air to the control box when excess air pressure is present, thereby preventing air from being directed to the air inflation system which is needed for the trailer braking system. The control box contains a pressure regulator which is set to the cold tire pressure of the particular tires on the trailer so as to supply air to the tires at the desired pressure level in the event of a leak. Air is directed from the control box to the leaking tire through one of the trailer axles, which either carries an air line from the control box, or is sealed and functions as an air conduit. The pressurized air carried by the axles communicates with each pair of trailer tires mounted thereon through a rotary union assembly by which air flow is directed from a stationary air line to the valve stems on the rotating tires. Pressure responsive valves are employed between each rotary union assembly and its associated tires so that upon the occurrence of a leak in one of the tires, the resulting pressure loss will cause one of the valves to open and allow air flow from the rotary union assembly to pass therethrough to the leaking tire.

While these central tire inflation systems are well known and in widespread use, they suffer from several shortcomings. The rotary union assemblies employed in these systems have a relatively limited useful life span before the rotary seals begin to leak. The rotary seals, or rotary unions as they are frequently called, which are employed in these assemblies are generally located within the wheel lubrication compartments adjacent the ends of the axles. Accordingly, any air leakage in the rotary union seals causes an air pressure build up within the lubrication compartment which can damage the oil seals therein, and create an oil leak. If the wheel bearings lose their lubrication, they will seize up and can cause a fire. In addition to creating the potential for a dangerous fire, the positioning of the rotary union within the lubrication compartment of the wheel makes accessibility to the elements comprising the rotary union both difficult and awkward. As a result, the costs of repair and replacement are significantly increased.

Other problems facing central tire inflation systems include a lack of uniformity in tractor trailer wheel hub cap configurations and off-center mountings. The former situation results in variations in the axial distance between the ends of the axle spindles and end walls of the hub caps. This distance generally determines the spacing between the air inlet of the assembly and the rotary seal therein. It would be highly desirable to provide a rotary union assembly which could readily accommodate such dimensional variations and thereby obviate the need to provide differently sized assemblies or replacement components for different hub cap configurations. Preferably, the rotary union assembly should also accommodate off-center alignments of the axle spindle and hub caps without incurring additional wear on the air seals in the assembly which further shortens the life of the assembly.

Accordingly, the need remains for an improved rotary union assembly that better integrates with the tractor trailer wheel hub cap, includes improved venting from within the hub cap compartment, and provides improved accessibility for replacement of the rotary union assembly or wear parts thereof at the expiration of their lifespan.

SUMMARY OF THE INVENTION

A rotary union assembly for use with a tire inflation system includes a hollow tube configured to deliver air between proximal and distal ends, a bullet having a central axial aperture receiving the tube therethrough, a proximal retaining structure defined on the proximal end of the tube, and a distal retaining structure defined on a distal end of the tube, configured to retain the bullet on the tube therebetween. A cartridge is coupled to a distal end of the tube and includes one or more apertures on a sidewall thereof in fluid communication with the tube. In use, the rotary union assembly is coupled between a non-rotating axle of a vehicle and the rotating hubcap of a tire rotating about the axle and may be removed as a unit for repair and/or replacement of wear parts on the assembly. Pressurized air from within the axle is communicated through the rotary union assembly and out airlines coupled to air stems on the rotating hubcap and then to the tires themselves to maintain them at the proper inflation pressure.

The foregoing and other objects, features and advantages of the invention will become more readily apparent from the following detailed description of a preferred embodiment of the invention that proceeds with reference to the accompanying drawings.

DETAILED DESCRIPTION

Figure 1:
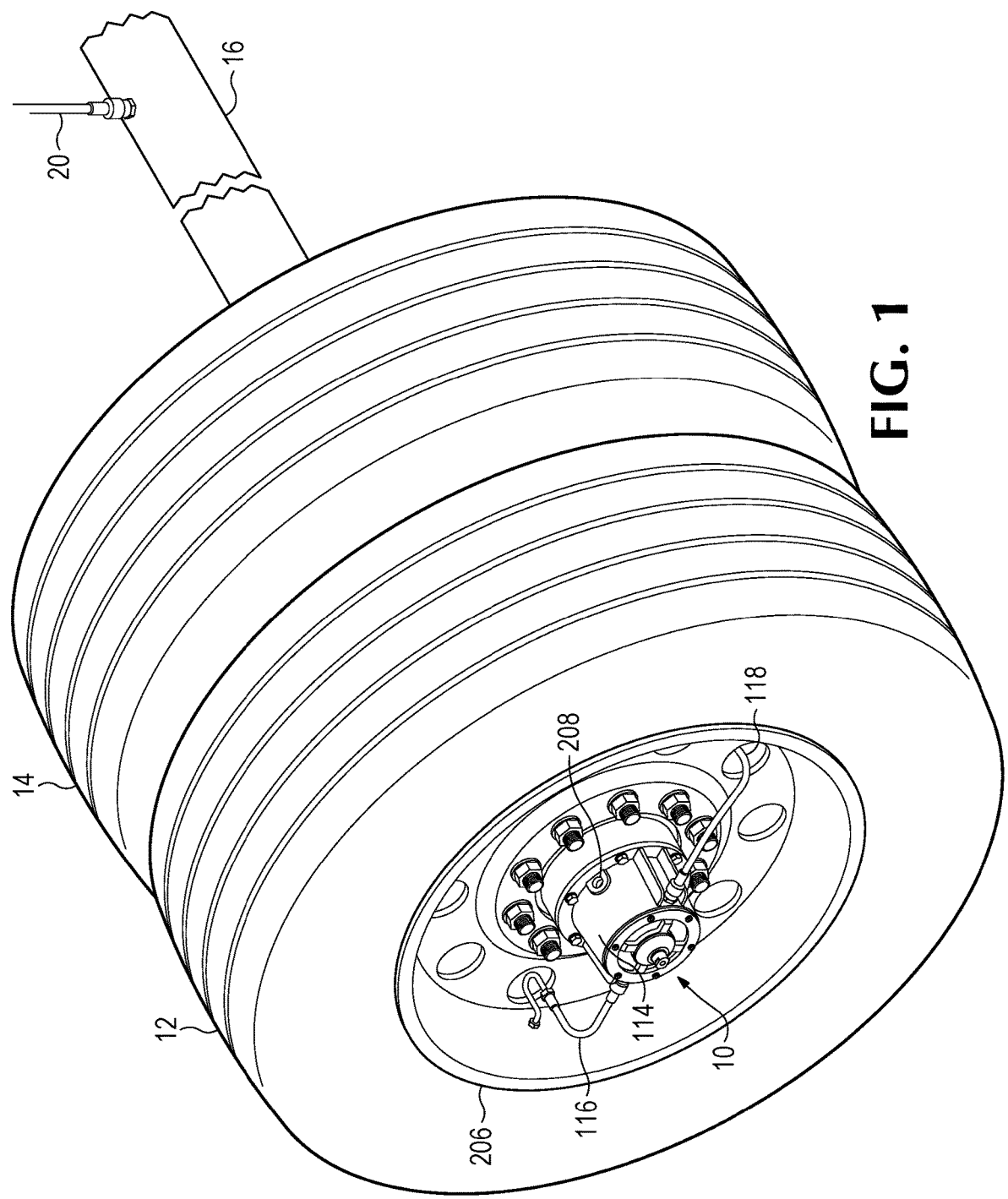
FIG. 1 is a partial perspective view of the rotary union assembly of the present invention shown secured to a hub cap on the outer wheel of a pair of tractor trailer tires mounted on a stationary axle.

Referring now in detail to the drawings such as in FIG. 1, the rotary union assembly 10 of the present invention, while useable on a wide variety of movable vehicles employing stationary axles for automatically maintaining the inflation pressure of the pneumatic tires thereon, is particularly adapted for use on tractor trailers. Accordingly, the assembly 10 will be described in conjunction with a pair of adjacent vehicle tires 12 and 14 mounted on a stationary tractor trailer axle 16. While identical rotary union assemblies 10 are provided at the end of each axle on the trailer to maintain the inflation pressure of the tires carried thereby, reference will be made to only one such assembly and the pair of tires it services.

The trailer axle 16, which carries tires 12 and 14, is sealed and functions as an air conduit to communicate the spindles 18 (FIG. 5) welded to the extended ends of a trailer axle 16 with an air supply line 20. Air supply line 20 provides air under pressure to the interior of axle 16 from the conventional air compressor on the tractor via a standard pressure protection valve and control box (not shown) to pressurize the axle at the cold tire pressure of the trailer tires.

Figure 2:
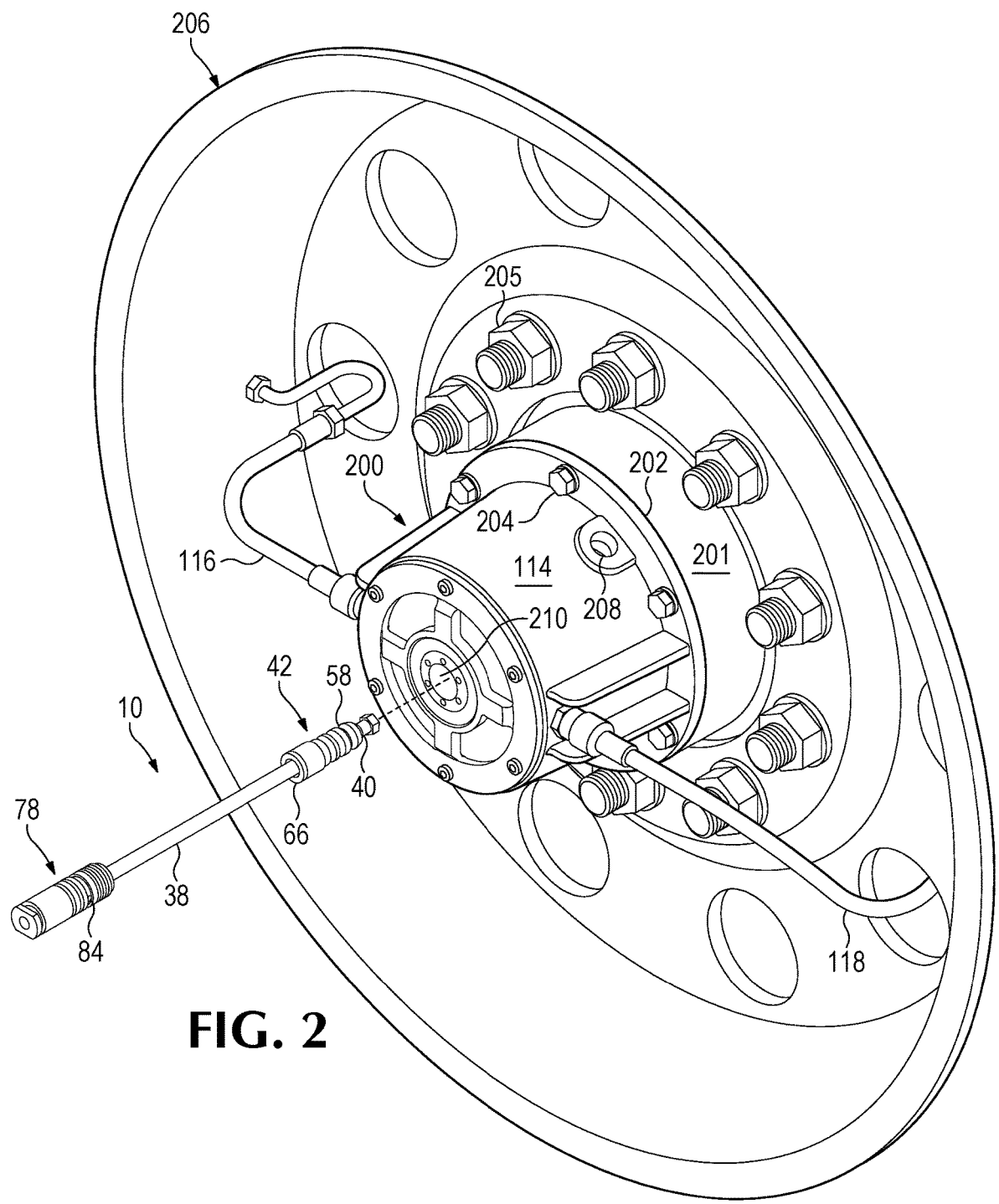
FIG. 2 is a partial perspective view of a portion of the assembly of FIG. 1 with the rotary union assembly exploded out from insertion through the hub cap.
Figure 3:
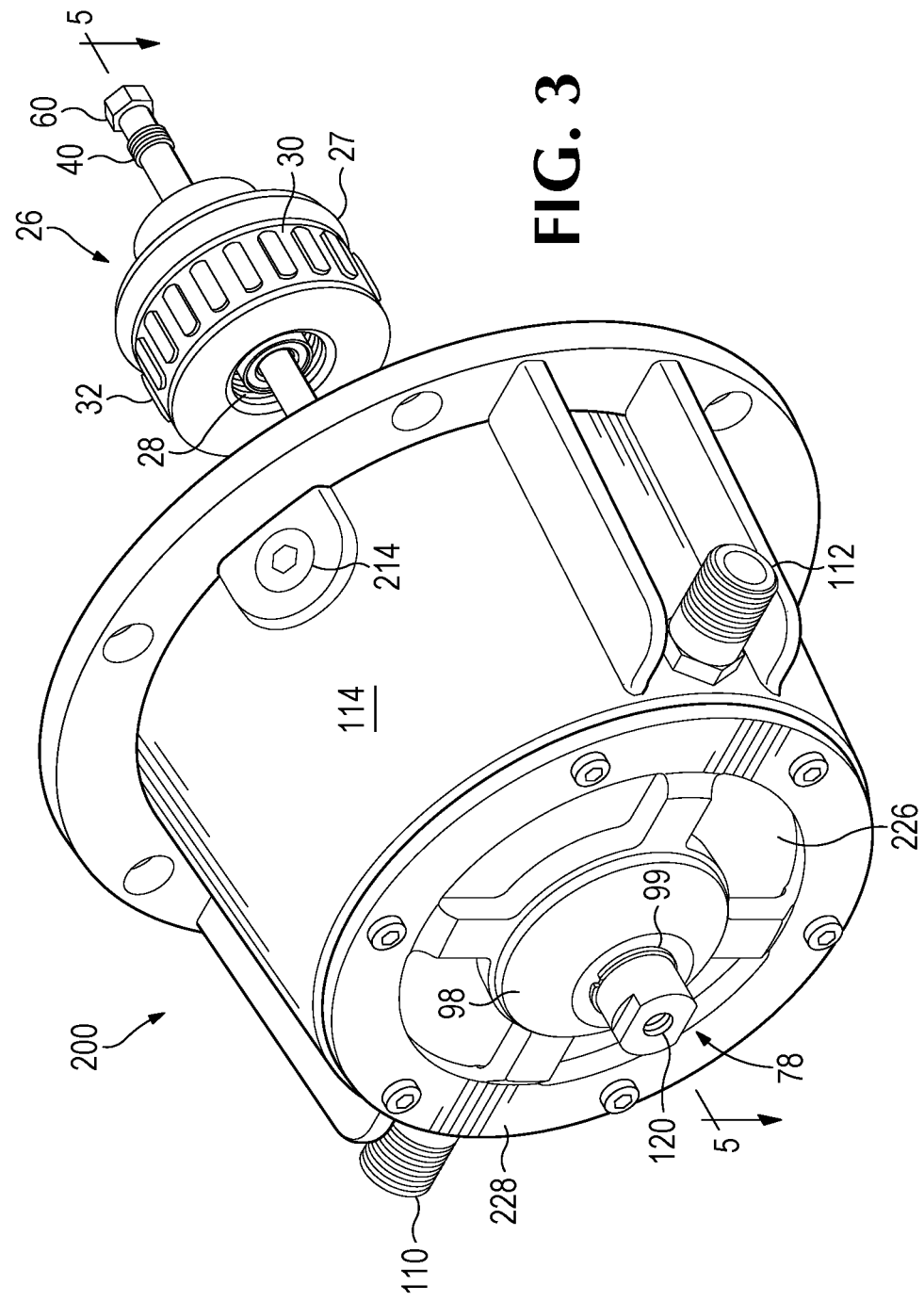
FIG. 3 is perspective view showing the rotary union assembly installed through the hub cap and axle plug.

A hubcap 200 is bolted onto wheel hub 201 and includes a generally cylindrical body with an annular outside wall 114. A larger diameter flange 202 formed on the proximal end of the hubcap 200 includes an array of holes 203 about the circumference of the flange for bolting 204 the hubcap to the wheel hub 201. The wheel hub 201 then accepts the wheel rim 206 and attached with lug nuts 205. The hubcap 200 includes an aperture 208 formed through its outside wall 114 and leading to a hollow interior 212 (FIG. 5) in which oil or some other lubricant is maintained. A plug 214 (FIG. 3) seals the aperture 208. An axial opening 210 through the hubcap 200 is sized to admit the rotary union assembly 10 therethrough as shown in FIG. 2.

Figure 5:
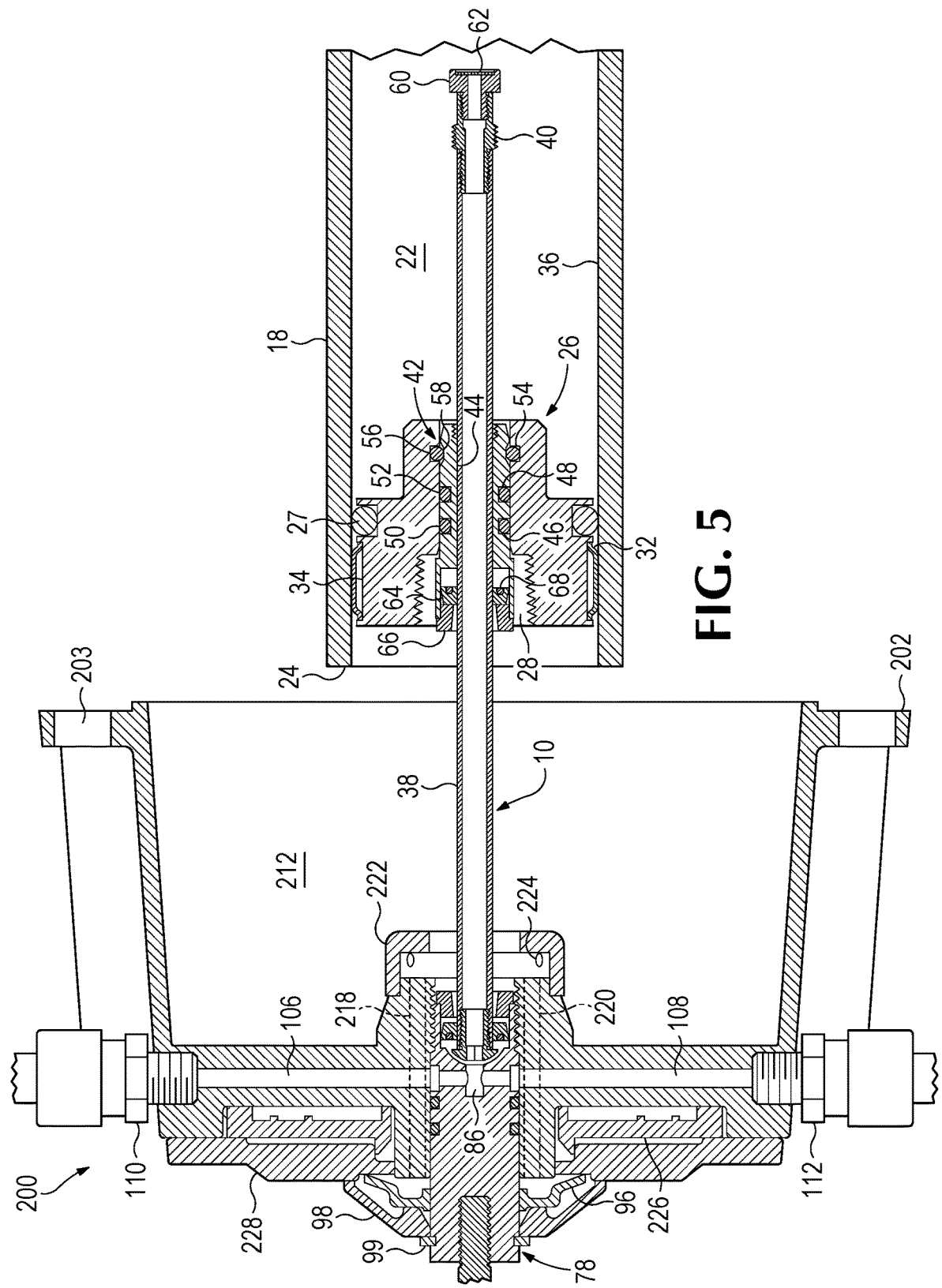
FIG. 5 is a partial side sectional view of the rotary housing, air lines and associated valves employed in the rotary union assembly of the present invention taken along lines 5-5 of FIG. 4.

Turning to FIG. 5, an axle spindle 18 has a centrally disposed conduit 22 extending axially therethrough which terminates downstream at an open bore end 24. The trailer axle system includes an axle plug 26 that fits into the end 24 of the spindle 18. An o-ring 27 is mounted in a groove in its outer surface and maintains an air-tight relationship with the inside surface 36 of spindle 18 so that pressurized air can only flow through the axial plug opening 28. A tolerance ring 30 (FIG. 3) is fitted within an annular channel 34 about the axle plug 26 and includes metal projections 32 about its circumference. When the axle plug is driven into the hollow end 24 of the spindle 18, these projections 32 deform as the plug is hammered into the spindle and tightly fit against the inside diameter of the spindle interior 22. Preferably, these metal projections 32 are spaced about an arc of the ring and run parallel to the axial length of the spindle. Once fitted, the annual ring 30 (and plug 26) is stationary with respect to the stationary spindle 18.

Figure 4:
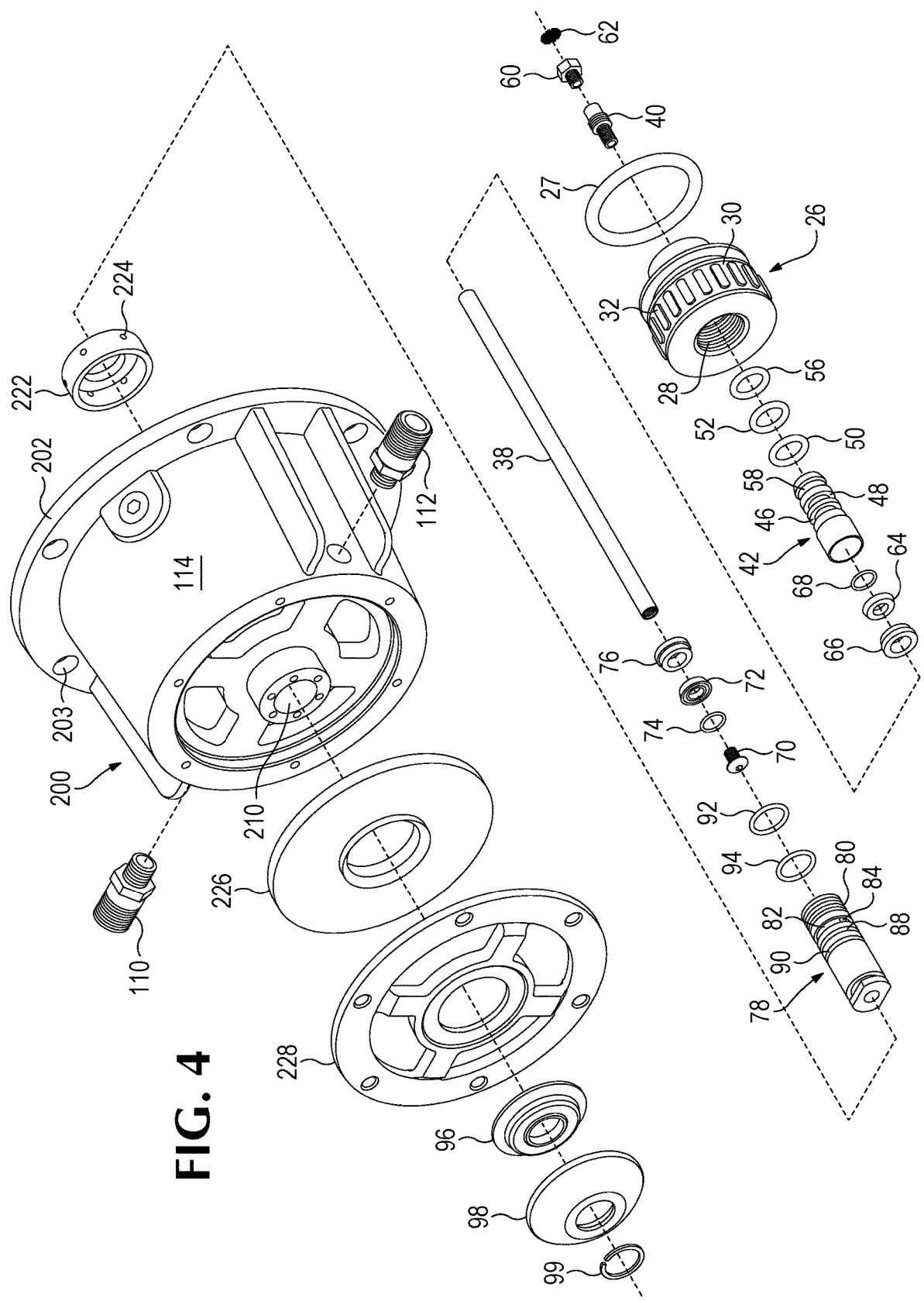
FIG. 4 is an exploded perspective view of the components of the rotary union assembly of the present invention.

Turning also to FIG. 4, the replaceable portion of the air inflation system, referred to herein as the rotary union assembly 10, includes an elongate, hollow, and rigid delivery tube 38 with a threaded end 40 on an upstream or proximal end of the tube 38. The threaded end 40 forms a proximal retaining portion of the rotary union assembly 10 to keep a thimble or bullet-shaped element 42 (hereinafter referred to as "bullet 42") from sliding off that end of the delivery tube 38. The bullet 42 includes an axial aperture 44 that slidingly receives the tube 38 along its length so that the bullet can move along the length of the tube 38 with the proximal end closest to the threaded end 40 of the delivery tube. The bullet 42 includes a pair of annular grooves 46, 48 around its outside and spaced along its length, with an O-ring 50, 52 inserted within each groove. A u-cup/lipseal 64 and O-ring 68 are inserted in the distal end of the cartridge and a brass fitting 66 press fit into a distal end of the bullet 42 adjacent the u-cup 64 to maintain it within the bullet 42.

The bullet 42 is press-fit into the interior diameter 28 of the axle plug 26. A proximal annular groove 54 formed within the axial passage 28 near the upstream end of the plug 26 receives an O-ring 56. When the bullet 42 is properly seated within the axial passage 28 of the plug 26, an annular depression 58 formed adjacent a proximal end of the bullet 42 receives the inside diameter of O-ring 56 and prevents the bullet 42 from moving further forward without undue axial force. In total, the O-rings 50, 52, and 56 prevent air from within the axle from escaping out the outside diameter of the bullet 42.

A delivery tube fitting 60 is press fit or threaded into the proximal end 40 of the delivery tube 38 and includes a filter 62 covering the axial air passage formed therethrough. Pressurized air from within the hollow interior of the trailer axle 16 and spindle conduit 22 is forced into the delivery tube 38 through the filter cover 62 and into the hollow passage formed through the distal fitting 60, threaded end 40, and down the length of the delivery tube 38 itself to a downstream end.

The downstream or distal end of the bullet 42 is sealed against the delivery tube 38 via a lipseal 64 and brass fitting 66. Lipseal 64 has a generally u-shaped profile, forming an annular groove opened to a distal end of the bullet 42. An o-ring 68 is received within the annular groove of lipseal 64 and expands the proximal end of the lipseal to fill the gap between interior surface of the bullet axial aperture 44 and the exterior surface of the delivery tube 38. The exterior annular surface of the lipseal 64 preferably has a frustoconical shape. When the bullet 42 is sealed in this fashion against the delivery tube 38, a measured resistance is imparted to the bullet 64 so that it does not loosely slide along the length of the delivery tube but instead stays in position once forced there with slight axial pressure.

A delivery tube seal face 70 is press fit or threaded into the distal end of the delivery tube 38. The seal face 70 is preferably dome- or convex-shaped with a diameter greater than the delivery tube 38 so as to form a proximal retaining portion and includes a centrally formed aperture that leads to the hollow interior of the delivery tube 38. In this fashion, the bullet 38 is slidingly retained between end portions 40 and 70 and prevented from moving off of the delivery tube 38.

During servicing of the rotary union assembly, the assembly may be unitarily removed from within the plug 26 and hubcap 200 and the retaining portions 40, 70 detached from the delivery tube 38 so that the bullet 38 may be removed and replaced should it or its components—e.g. o-rings 50, 52, 68 or lipseal 64—wear out. In a preferred embodiment, the seal face 70 is formed of an enhanced wear resistant material such as hardened 4140 steel.

Figure 6:
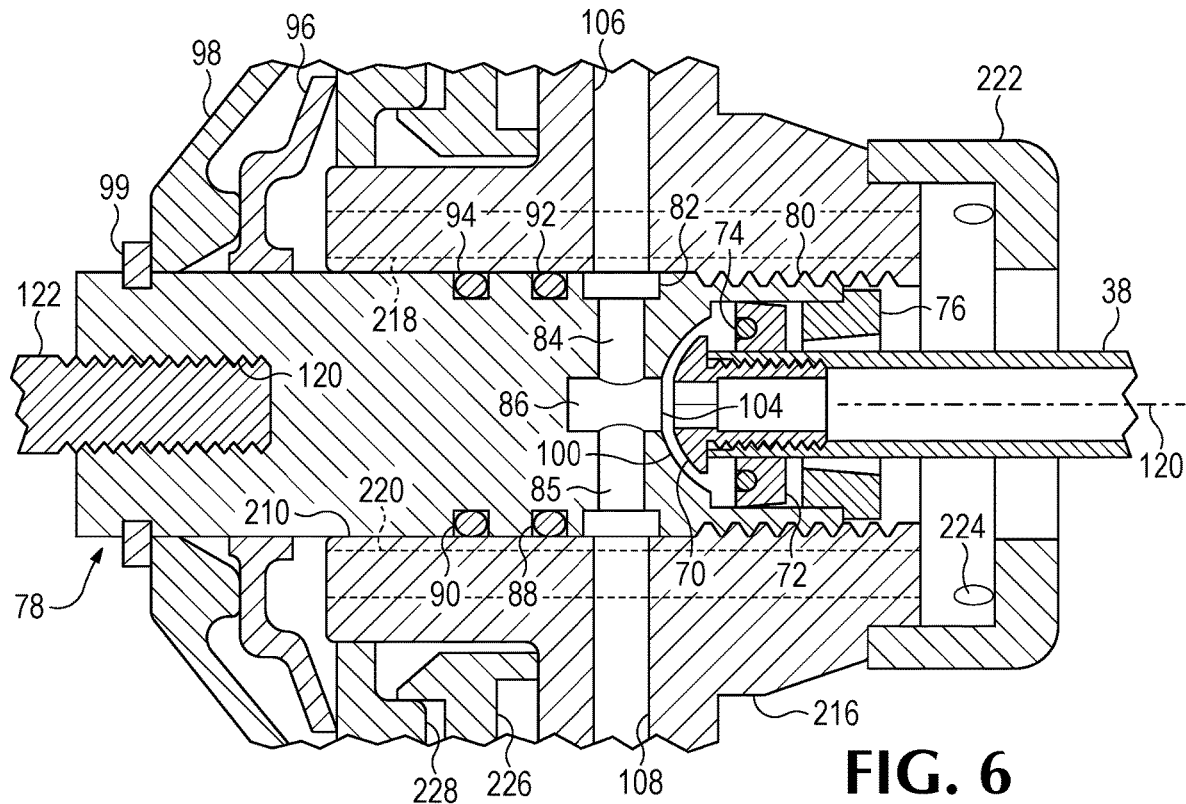
FIGS. 6 and 7 are partial side sectional views of a cartridge portion of the rotary union assembly showing how the rotary union can accommodate potential angular inflexion due to misalignment of the hub cap with respect to the stationary axle.
Figure 7:
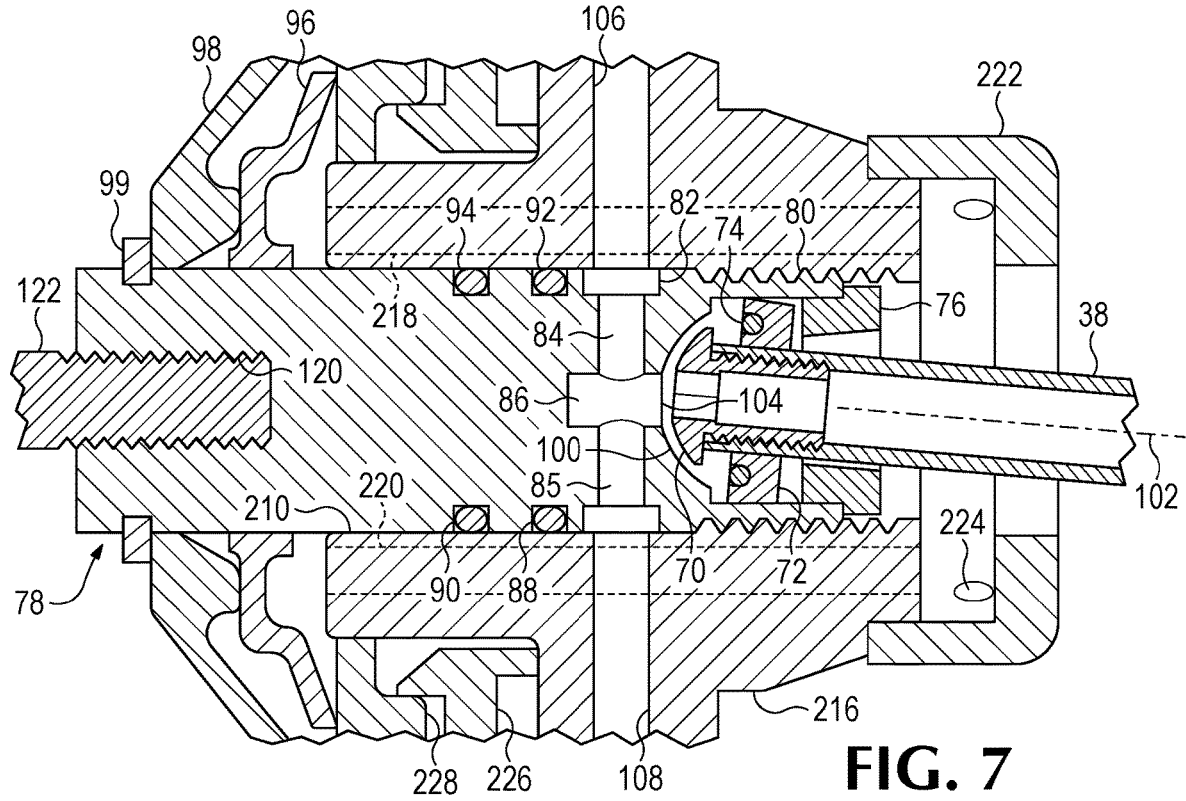

Turning also to FIGS. 6 and 7, adjacent to the delivery tube seal face is a u-cup/lipseal 72 and O-ring 74, and a brass fitting 76 as with the bullet 42. The u-cup 72 includes a frustoconical outer surface to accommodate tilting of the u-cup within the cartridge cavity as described below. The O-ring 74 deforms under air pressure to force the inner diameter wall of the u-cup 72 against the delivery tube 38 and the outer diameter wall against the inner wall of the cartridge 78 within the cavity for a better air tight seal.

A cartridge 78 formed of high strength steel includes a threaded distal end 80, a first annular groove 82 adjacent the threaded end, and a pair of apertures 84, 85 formed within the first annular groove 82. Apertures 84, 85 are formed on opposing sides of the groove through the wall of the cartridge 78 and lead to the hollow interior 86 of the cartridge. Additional annular grooves 88, 90, fitted with respective o-rings 92, 94, lead to a proximal end of the cartridge 78. A rubber flapper 96 with a sealing surface curved toward a distal end of the delivery tube 38 is fitted around the cartridge. A hard plastic shield 98, curved in the same fashion but wider than the flapper, is fitted proximally around the cartridge at the proximal end and retained in place with an annular clip 99 fitted within a respective groove at the proximal end of cartridge 78.

The cartridge includes an axial aperture 86 with an interior intermediate cavity wall 100 having a concave shape complementary to the convex shape of the delivery tube seal face 70. The complementary rounded surfaces allow the delivery tube 38 to be tilted out of axis 102 with the hub cap—see, e.g., difference between FIGS. 6 and 7—such as when the hub cap is out of round. A small central aperture 104 is formed within the intermediate wall that is in fluid communication with the pair of apertures 84, 85.

The delivery tube 38 and seal face 70 are inserted within the cartridge so that the seal face 70 rests adjacent to or against the concave intermediate wall 100. The u-cup/lipseal 72 and brass fitting 76 are inserted into the end of the cartridge thus sealing the proximal end of the delivery tube 38 and seal face 70 into the interior of the cartridge 78 adjacent the concave intermediate wall 100.

In use, pressurized air is delivered to the trailer axle 16, and communicated through the central aperture 28 of the axle plug 26 into the distal portion of the delivery tube 38. The air continues down the delivery tube 38 and out the central aperture on the delivery tube seal face 70. The high pressure air forces the seal face incrementally away from the concave intermediate wall 10 of the cartridge 78 so that it "floats." Air passes through the small central aperture 104 of the intermediate wall 100 and out through the pair of apertures 84, 85 leading to the annular groove 82. The annular groove is aligned with radial passages 106, 108 formed within axial wall 216 the hubcap 200 and leading to respective hose fittings 110, 112 attached to the outside wall 114 of the hubcap 200. Air-hose feed tubes 116, 118 are coupled to respective hose fittings 110, 112 that then lead to the valve stems of respective outer and inner tires 12, 14. An air regulator feeds the axle/spindle with the desired air pressure specified by the tire manufacturer. When an air pressure drop is detected (e.g. because the tire air pressure drops below the recommended amount) then the air regulator pumps additional air into the system.

The distal end of the air delivery system—including the axle plug 26, the delivery tube 38, the cartridge 78, and the delivery tube seal face 70—is fixed in relation to the stationary axle 16. The rotating parts of the system include the brass seal fitting 76 adjacent the seal face 70, the cartridge 78, the flapper 96, the shield 98, and the hubcap 200. The u-cup 72 adjacent the seal face 70 and brass fitting 76 may remain stationary or rotate, but is formed of sufficiently durable material such as nitrile so as not to wear out before other elements of the system. The list of interface surfaces between rotating and stationary surfaces include the following: (1) the brass fitting 76 rotating with respect to the delivery tube 38, (2) the concave intermediate wall 100 of the cartridge 78 rotating with respect to the adjacent seal face 70, and (3) the u-cup 72 with respect to either the rotating brass fitting 76 or the stationary seal face 70. It is possible that the delivery tube 38 will not rotate with the hubcap 200, in which case there is a low friction, steel on steel, wear surface between the cartridge 78 and the outside diameter of the delivery tube 38 received within it. The need for wear surfaces is thus minimized thus requiring replacement of the system less frequently. The configuration of the system further allows all wear and seal parts—including all o-rings—to be withdrawn from the axle plug 26 and out the central aperture 210 of the hub cap 200 for easy replacement. A distal face of cartridge 78 includes a threaded bore 120 into which a bolt 122 or other tool inserted so that the rotary union assembly 10 may be withdrawn whole from the axle 16 and hubcap 200 as described further below.

An arrangement of multiple vent tubes—e.g. tubes 218, 220—spaced around the central aperture of the hubcap 200 pass between the inside cavity 212 and outside of the hubcap and act bleed air to atmosphere that may build up in the interior of the hubcap 200 (e.g. from a leak of the air delivery system). A vent cover 222 covers the inside vent tube holes and can include radial holes 224 leading to the interior 212 of the hubcap. The flapper 96 covers all of these outside vent tube holes and keeps moisture out of the hub cap, but deforms to let air out when the pressure builds up too much (e.g. "burps" the air) within the hub interior. The shield 98 covers the flapper and protects it from the elements. The flapper 96 and shield 98 are retained via a snap ring 99 set within an annular notch formed adjacent a proximal end of the cartridge 78. Notches within the annular outside of the shield further assist in releasing the air. The hubcap 200 is bolted outside the tire to cover the axle opening and includes a raised annular ridge ("centering ring") on an inside surface thereof to help center the hub cap onto the tire hub.

Fitted over the hub structure enclosing the vent tubes 218, 220 and the radial air passages 106, 108 are elements adapted to allow a driver to see into the hubcap interior 212 to check to see if the correct amount of oil is in the hubs. A lexan sight disk 226 is fitted over the central hub axis and a retaining ring 228 installed over the sight disk 226 to keep it in place. Sight disk 226 is transparent, thus allowing an operator to look in to interior 212. If grease is used as a lubricant, then the sight disk 226 can be greyed out.

Figure 8:
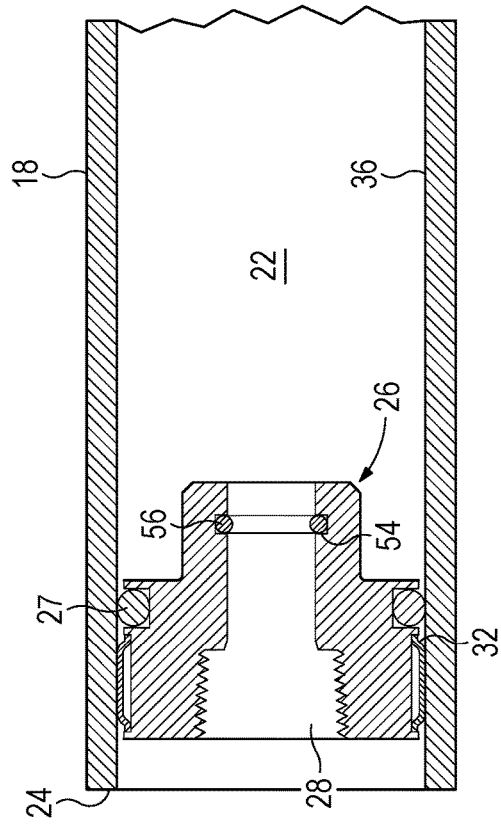
FIGS. 8-10 are partial side sectional views illustrating the installation of the rotary union as a unitary whole through the hub cap and into the interior of the stationary axle so that pressurized air from within the axle can be drawn through the rotary assembly to passages formed within the hub cap.
Figure 8:
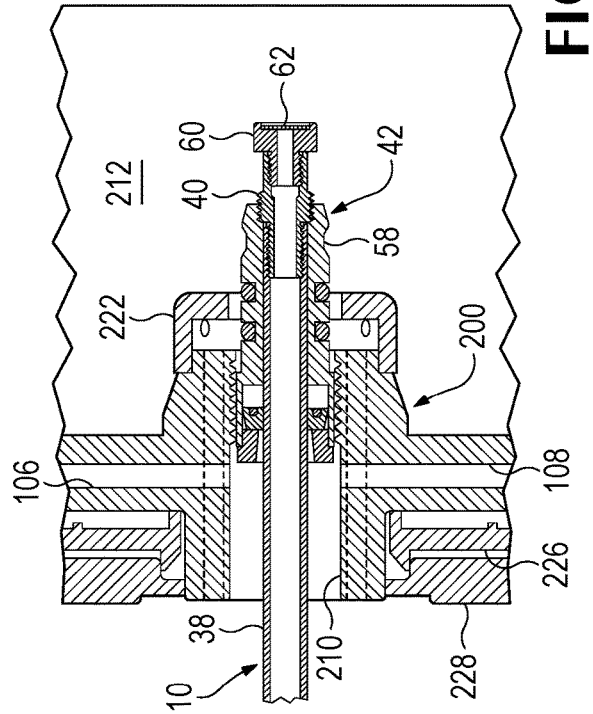
Figure 9:
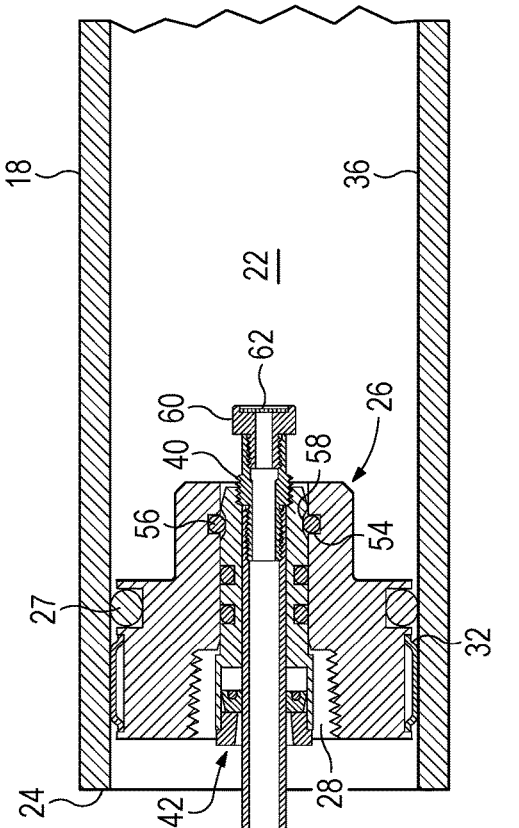
Figure 9:
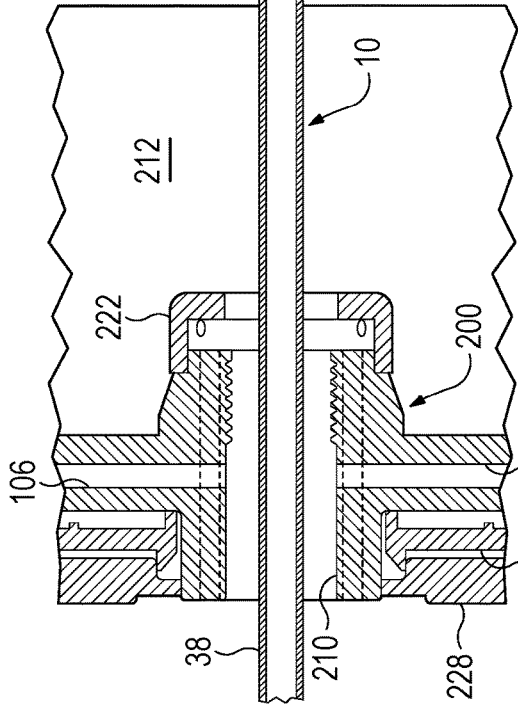
Figure 10:
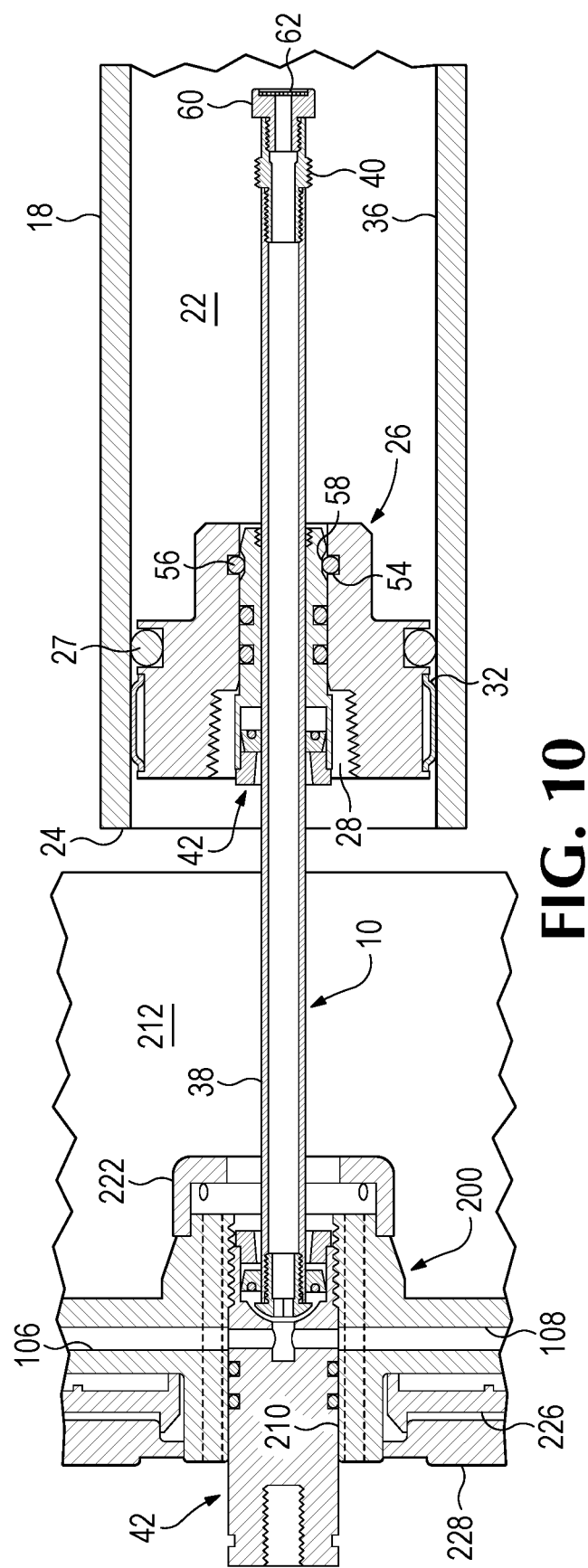

FIGS. 8-10 illustrate the steps for installing the rotary union assembly 10 between the pressurized trailer axle 16 and hubcap 200 to effect transfer of pressurized air from within the axle to the truck tires 12, 14.

In a first step, the plug 26—having an axial passage 28 therethrough—is secured to the end of the axle of a vehicle as by inserting into the hollow conduit 22 of a stationary spindle 18. The rotary union assembly 10 is prepared by threading the bullet 42 onto the proximal threaded portion 40 of the hollow tube 38. The rotary union assembly 10 is then inserted through an aperture 210 formed through a rotating axis of the hubcap 200 (FIG. 8) until the bullet 42 is captured within and seals against the axial passage 28 of the plug 26 (FIG. 9). The bullet 42 is then disengaged from the proximal end 40 of the tube 38. The act of sealing the bullet 42 into the axial passage 38 of the plug 26 causes the bullet to be snugly retained therein so that the remaining portion of the rotary union assembly 10, and particularly the hollow tube 38, can be unscrewed from the bullet 42. The hollow tube 38 is in this fashion disengaged from the bullet and the tube can be slidingly pushed through a central axial aperture 44 of the bullet 42 into the hollow interior of the axle 16 and/or spindle 18. The hollow tube 38 continues to be pushed inward until the cartridge 78 on the distal end of the tube is received within the axial aperture 210 formed through the hubcap 200 and can be threaded therein. When properly seated as shown in FIG. 10, the radial air passage 106, 108 within the hub cap leading to the truck tires 12, 14 is in fluid communication with passages formed through the cartridge 76 and hollow tube 38 so that pressurized air may be communicated between the stationary axle 16 and the rotating tires 12, 14.

The hollow tube can be sized to accommodate a wide variety of vehicles with varying distances between the hubcap and axle. That is, for vehicles with short distances between the hubcap and axle, the cartridge 78 and bullet 42 will be closer together and thus a majority of the hollow tube 38 may slide through the bullet and extend through the proximal end. In contrast, for vehicles with longer distances between the hubcap and axle, the portion of the tube extended distally through the bullet will be shorter. The sliding relationship of the bullet 42 to the tube 38 thus provides a one-size-fits-all option so that one product can be used for a wide variety of trailer types.

Removal of the rotary union assembly occurs in reverse, with a bolt 122 or other tool inserted within the axial end 120 of the cartridge 76 and used to pull or unthread the cartridge 78 from the hubcap aperture 210. Withdrawing the cartridge 78 causes the threaded proximal end 40 of the hollow tube 38 to slide back into the interior of the bullet 42. The threaded end 40 may then be threaded into the bullet 42, or simply pulled with the cartridge to pull it and the bullet out through the hubcap aperture 210 with the rest of the assembly 10. This may be done without removing the hubcap 200 or draining the hubcap—as oil or other lubricant is typically filled within the hubcap interior 212 to a level that is below the axis of the hubcap and thus below the level of the hubcap axial aperture 210 through which the assembly 10 is removed.

Advantages of the present design include the following. The bullet slides back and forth on the tube to accommodate different hub/spindle spacing. Furthermore, threads on the end of the tube allow for installation of the assembly into an axle plug fitted into spindle. Once inserted within the axle plug, the tube may be unscrewed several turns until the bullet slides on the tube to accommodate different distances between the axle and hubcap. Additionally, the design allows for one-part replacement without draining oil from the cap. Components can be integrated into existing trailer parts such as the hubcap and all sealing components are included in one replaceable cartridge component that can be removed and replaced outside of the hubcap. Fewer parts mean less cost and less installation time. The sealing cartridge eliminates a bearing and allows the tube and the cartridge to not interfere or make contact, thus extending sealing cartridge life. The sealing cartridge allows for rotation or non-rotation of the tubular member, to reduce wear and extend seal life. Additionally, the sealing component allows for misalignment of out of concentric hubcap installation or wheel hub wobble reducing component fatigue and maximizing seal life and less down time for repair. Finally, the unitary installation allows for easier repair and quicker replacement.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A tire inflation system comprising:
   a hubcap secured to a wheel attached to an axle of a vehicle and forming an interior cavity with the wheel into which a lubricating fluid can be maintained, the axle providing a source of pressurized air;
   a plug fitted into a hollow end of the axle, said plug including a passage therethrough;
   at least one hose fitting formed on an outside wall of the hubcap;
   an aperture passing axially through the hubcap;
   a radial air passage leading from an interior wall of the aperture to the hose fitting; and
   a rotary union assembly received through the axial hub cap aperture and the plug passage, said rotary union including a hollow tube extending into the axle, a bullet-shaped element inserted within the plug passage and receiving the hollow tube therethrough, proximal and distal retaining portions on each end of the hollow tube operative to maintain the bullet-shaped element therebetween, and a cartridge inserted within the hub cap aperture and receiving a distal end of the tube, thereby forming an air passage for air from the axle entering the tube, passing into the cartridge and out through the radial air passage to the hose fitting, said cartridge having an annular groove about a circumference of the cartridge and an aperture formed on opposing sides of the groove through the wall of the cartridge.

2. The tire inflation system of claim 1, the hubcap further including a vent passage passing from the interior cavity of the hub cap to an exterior surface.

3. The tire inflation system of claim 1, further including an array of vent passages passing from the interior cavity of the hubcap to an exterior surface disposed about the aperture passing axially through the hub cap.

4. The tire inflation system of claim 3, further including a flapper disposed over openings of the array of vent passages on the hub cap surface and operative to release over-pressured air to atmosphere from within the hubcap cavity.

5. The tire inflation system of claim 1, wherein the proximal retaining structure is a threaded portion, the bullet-shaped element having a first position threaded onto the threaded portion, and a second position unscrewed from the threaded portion and slidingly moveable along a length of the tube.

6. The tire inflation system of claim 1, wherein the distal retaining structure includes a seal face having a convex outer surface of a larger diameter than the tube, said seal face being sealed within a cavity formed on one end of the cartridge adjacent a complementary convex surface formed on a bottom face of the cavity to enable the cartridge to flex off-axis from the tube.

7. The rotary union assembly of claim 1, further including a lipseal coupled about the tube adjacent the seal face and including an annular groove facing distally with an o-ring inserted within the annular groove.

8. The rotary union assembly of claim 7, said lipseal having a frustoconical outer annular surface.

9. A method for installing a rotary union assembly between a pressurized axle and a hubcap of a trailer system in order to conduct pressurized air from a source to a tire mounted to a wheel of a vehicle, where said rotary union assembly is of a type having a hollow tube with a bullet-shaped element coupled to a proximal end of the tube and a cartridge coupled to a distal end of the tube, the method comprising:
- securing a plug, having an axial passage therethough, to an end of an axle of a vehicle;
- inserting the rotary union assembly through an aperture formed through a rotating axis of a hubcap until the bullet-shaped element is captured within and seals against the axial passage of the plug; and
- disengaging the bullet-shaped element from the proximal end of the tube and pushing the tube through the bullet-shaped element and further into the interior of the axle until the cartridge on the distal end of the tube is received within the axial aperture formed through the hubcap and is in fluid communication with a passage formed through a wall of the hubcap aperture.

10. The method of claim 9, wherein the distal end of the tube is sealed within a cavity formed on a proximal end of the cartridge, the method further including tilting a seal face formed on the distal end of the tube within the cavity to accommodate off-center alignment of the axle spindle with the hubcap.

11. The method of claim 10, further including floating the seal face from a bottom surface of the cavity when the rotary union assembly is under pressure.

\* \* \* \* \*